(12) United States Patent
Hintennach

(10) Patent No.: US 10,490,819 B2
(45) Date of Patent: Nov. 26, 2019

(54) ELECTROCHEMICAL ENERGY STORAGE SYSTEM AND BATTERY

(71) Applicant: Daimler AG, Stuttgart (DE)

(72) Inventor: Andreas Hintennach, Tamm (DE)

(73) Assignee: Daimler AG, Stuttgart (DE)

( * ) Notice: Subject to any disclaimer, the term of this patent is extended or adjusted under 35 U.S.C. 154(b) by 67 days.

(21) Appl. No.: 15/317,816

(22) PCT Filed: May 19, 2015

(86) PCT No.: PCT/EP2015/001020
§ 371 (c)(1),
(2) Date: Dec. 9, 2016

(87) PCT Pub. No.: WO2015/188914
PCT Pub. Date: Dec. 17, 2015

(65) Prior Publication Data
US 2017/0117549 A1     Apr. 27, 2017

(30) Foreign Application Priority Data

Jun. 12, 2014   (DE) ................. 10 2014 008 740

(51) Int. Cl.
*H01M 4/62*     (2006.01)
*H01M 2/16*     (2006.01)
(Continued)

(52) U.S. Cl.
CPC ......... *H01M 4/625* (2013.01); *H01M 2/1613* (2013.01); *H01M 4/382* (2013.01);
(Continued)

(58) Field of Classification Search
CPC .... H01M 4/625; H01M 4/382; H01M 4/5815; H01M 4/66; H01M 4/663; H01M 2/1613; H01M 10/0525
See application file for complete search history.

(56) References Cited

U.S. PATENT DOCUMENTS

| 4,057,678 A | 11/1977 | Walker, Jr. |
| 7,175,937 B2 | 2/2007 | Cho et al. |
(Continued)

FOREIGN PATENT DOCUMENTS

| CN | 1494173 A | 5/2004 |
| CN | 1679185 A | 10/2005 |
(Continued)

OTHER PUBLICATIONS

Japanese Office Action issued in Japanese counterpart application No. 2016-572303 dated Jul. 24, 2018, with partial English translation (Twelve (12) pages).
(Continued)

*Primary Examiner* — Jimmy Vo
(74) *Attorney, Agent, or Firm* — Crowell & Moring LLP

(57) ABSTRACT

An electrochemical energy storage system includes two electrodes and a separator disposed between the two electrodes. The separator is mechanically flexible such that a position of the separator between the two electrodes is alternatively shiftable in respective directions towards the two electrodes depending on an electrochemical process taking place between the two electrodes and the separator has elasticity such that a shape and/or a volume of the separator is changeable depending on the electrochemical process taking place between the two electrodes.

8 Claims, 3 Drawing Sheets

(51) Int. Cl.
  *H01M 4/38* (2006.01)
  *H01M 4/58* (2010.01)
  *H01M 10/0525* (2010.01)
  *H01M 4/66* (2006.01)

(52) U.S. Cl.
  CPC ..... *H01M 4/5815* (2013.01); *H01M 10/0525* (2013.01); *H01M 4/66* (2013.01); *H01M 4/663* (2013.01)

(56) References Cited

U.S. PATENT DOCUMENTS

| | | |
|---|---|---|
| 7,575,832 B2 | 8/2009 | Hennige et al. |
| 7,914,925 B2 | 3/2011 | Ozawa et al. |
| 2005/0031942 A1 | 2/2005 | Hennige et al. |
| 2011/0281156 A1 | 11/2011 | Boren et al. |
| 2012/0121960 A1 | 5/2012 | Hall et al. |
| 2012/0315539 A1 | 12/2012 | Lashmore et al. |
| 2013/0149567 A1 | 6/2013 | Schaefer |

FOREIGN PATENT DOCUMENTS

| | | |
|---|---|---|
| CN | 101808819 A | 8/2010 |
| DE | 10 2010 018 731 A1 | 11/2011 |
| JP | 11-233116 A | 8/1999 |
| JP | 2005-502177 A | 1/2005 |
| JP | 2005-222787 A | 8/2005 |
| JP | 2012-243417 A | 12/2012 |
| JP | 2013-534027 A | 8/2013 |
| JP | 2013-211172 A | 10/2013 |
| WO | WO 03/021697 A2 | 3/2003 |
| WO | WO 2004/021477 A1 | 3/2004 |
| WO | WO 2009/033015 A1 | 3/2009 |
| WO | WO 2012/137618 A1 | 10/2012 |
| WO | WO 2012/139742 A1 | 10/2012 |

OTHER PUBLICATIONS

PCT/EP2015/001020, International Search Report dated Aug. 20, 2015 (Three (3) pages).

U.S. Patent Application, "Separator for an Electrochemical Storage System, Method for the Production of an Electrode Material and Electrochemical Energy Storage System", filed Dec. 9, 2016, Inventor: Andreas Hintennach.

Japanese Office Action issued in Japanese counterpart application No. 2016-572303 dated Nov. 28, 2017, with partial English translation (Six (6) pages).

Chinese Office Action issued in Chinese counterpart application No. 201580030956.9 dated Sep. 30, 2018, with partial English translation (Eight (8) pages).

Partial translation of Chinese Office Action in English issued in Chinese counterpart application No. 201580030956.9 dated May 28, 2019 (Three (3) pages).

ELECTROCHEMICAL ENERGY STORAGE SYSTEM AND BATTERY

BACKGROUND AND SUMMARY OF THE INVENTION

The invention relates to an electrochemical energy storage system. The invention furthermore relates to a battery.

A lithium-sulphur battery is known from DE 10 2010 018 731 A1, comprising a first electrode comprising lithium, a second electrode comprising sulphur and/or a lithium sulphide, a separator between the electrodes and an electrolyte in the separator. Here, the separator comprises a non-woven fleece made from polymer fibers.

An electrode for a battery is furthermore known from US 2011/0281156 A1, which is provided with carbon nanotubes, wherein the carbon nanotubes have a silicon matrix, by means of which volumetric changes to the battery are able to be compensated for during electrochemical processes within the battery.

The object of the invention is to specify an improved electrochemical energy storage system compared to the prior art, as well as an improved battery.

An electrochemical energy storage system comprises at least two electrodes, between which a separator is arranged. Provision is made according to the invention for the separator to be designed to be mechanically flexible.

The electrodes are formed as an anode and a cathode, wherein the separator divides the electrodes from one another spatially and electrically. Here, the separator is necessarily designed to be ion-permeable, such that the active material of the anode, e.g., lithium ions, is able to diffuse towards the cathode during a discharge process of the electrochemical energy storage system and back to the anode during the charging process. These electrochemical processes lead to volumetric changes to the electrodes, which is also referred as electrode "breathing". The mechanically flexible design of the separator enables the volumetric changes to the electrodes to be compensated for, such that the separator is able to be configured with correspondingly smaller dimensions compared to the prior art, since no additional construction space has to be present to compensate for the volumetric changes for the arrangement of the electrochemical energy storage system. In addition, an equally high degree of compression on single cells within the electrochemical energy storage system can take place.

The mechanically flexible design of the separator enables a passive positional change to the separator between the electrodes, depending on the electrochemical processes taking place between the at least two electrodes. The separator is then, for example upon enlargement of a cathode volume, shifted in the direction of the anode, whose volume is thus reduced.

The separator is alternatively or additionally designed to be elastic, wherein it may change its shape and/or its volume depending on the electrochemical processes taking place between the electrodes. The shape and/or volume change of the separator here takes place in a substantially passive manner depending on the volumetric changes to the electrodes, wherein a position of the separator is able to be altered or remains fixed. This means, for example, that if the volume of the cathode increases as a result of a discharge of the electrochemical storage system, the separator is deformed accordingly in the direction of the anode with its side facing the cathode. The cathode can therefore expand within the electrochemical energy storage system without external deformations of the single cells or the electrochemical energy storage system arising. Here, the separator can be deformed in the direction of the anode with only a very small loss of volume, wherein the side of the separator in the anode region facing the anode spreads out, for example with a bulge, or the volume of the separator is compressed on the cathode side in such a way that no or only very little bulge-like spreading out of the separator takes place on the anode side. Here, however, care must be taken to ensure that an ion exchange between the electrodes is secured.

According to a preferred exemplary embodiment, the separator is formed from a glass fiber membrane. The glass fiber membrane has a corresponding porosity, into which, according to a further preferred exemplary embodiment, a liquid, organic electrolyte is able to be poured, by means of which the active material of the anode is able to be transported through the separator. Alternatively, the separator may also be formed from a porous ceramic film or a porous polymer membrane.

The electrodes of the electrochemical energy storage system are each formed from a substrate and are coated with a composite material comprising an electrically conductive matrix and an active material which is integrated into the electrically conductive matrix in a defined manner.

The electrically conductive matrix is, for example, formed from a porous and mechanically flexible carbon structure such as, for example, graphite or carbon black. The mechanical flexibility of the carbon structure enables the aforementioned volumetric changes to the electrodes, in particular the active material, in a manner that is as free from damage as possible and without incurring any loss of the electrical contacting of the electrodes. The compensation for the volumetric changes to the active material in the electrodes can therefore be further improved.

The electrically conductive matrix of at least one of the electrodes, in particular the anode, additionally or alternatively comprises a silicon structure. Compared to the carbon structure, silicon has a reduced degree of electrical conductivity, but has the property of intercalating a larger amount of active material, in particular of metal ions such as lithium ions, and is therefore particularly suitable for coating the anode.

The silicon structure particularly preferably comprises nanoscale, tubular structures, such that the mechanical flexibility of the electrically conductive matrix can be increased in combination with the mechanically flexible carbon structure. As a result, the performance and lifespan of the electrochemical storage system can be improved considerably with respect to the prior art.

The invention moreover relates to a battery comprising at least one electrochemical energy storage system, by means of which the performance and lifespan of the battery can be increased compared to the prior art.

Exemplary embodiments of the invention are illustrated in greater detail below by means of drawings.

DETAILED DESCRIPTION OF THE DRAWINGS

Figure 1:
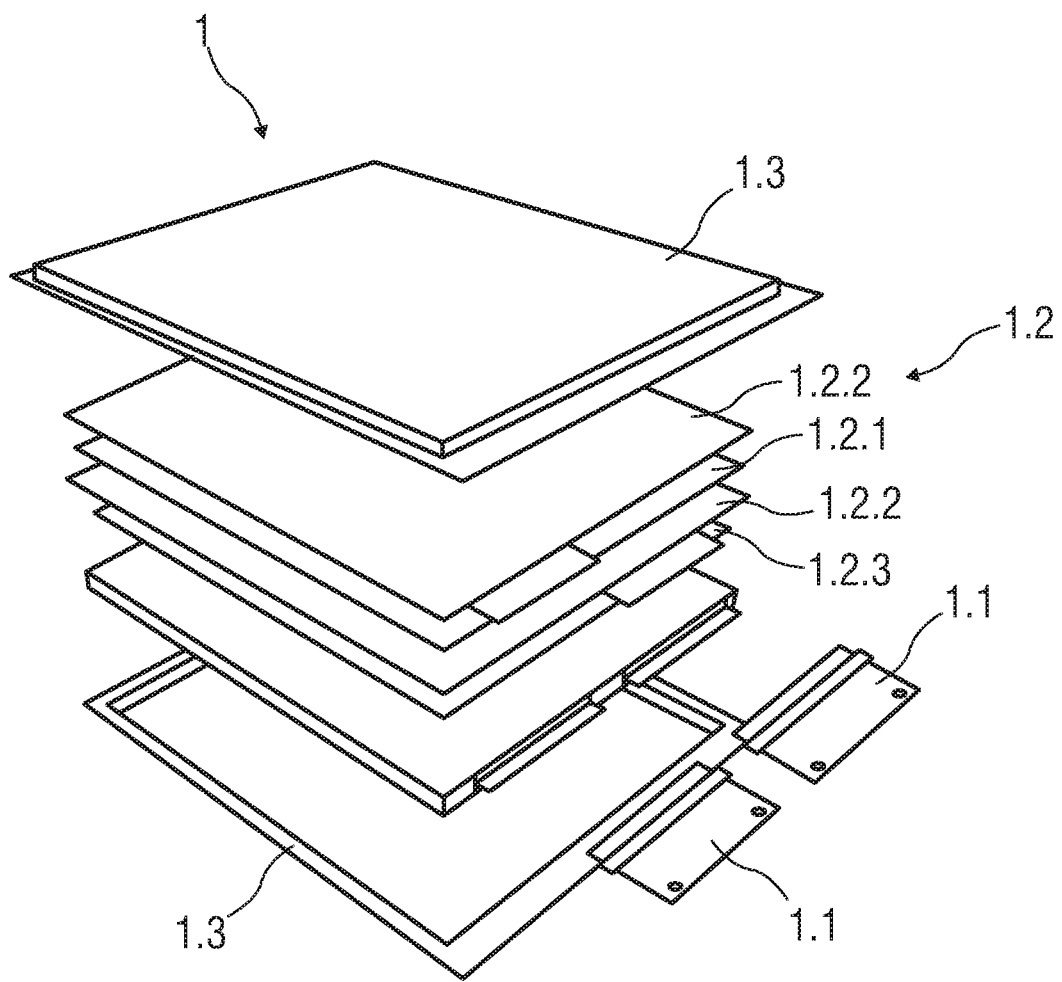
FIG. 1 is a schematic view of a single cell of a battery in an exploded diagram.

Parts that correspond to one another are provided with the same reference numerals in all figures.

In FIG. 1, a single cell 1 for a battery which is not depicted in more detail is shown. In particular, the battery is a rechargeable battery, for example a lithium-sulphur battery. Here, the single cell 1 represents an electrochemical energy storage system.

The single cell 1 is a so-called pouch or coffee bag cell, wherein a number of such single cells 1 are connected electrically in series and/or in parallel with one another to form the battery and wherein interconnection takes place via plate-like arresters 1.1 as electrical connections of the single cell 1.

Such a single cell 1 is implemented as a flat and as rectangular as possible storage system element for electrical energy which comprises an electrode foil arrangement 1.2 made from layers of several alternately stacked, foil-like anodes 1.2.1, separators 1.2.2 and cathodes 1.2.3, which is surrounded by a foil-like casing 1.3 which is formed from two shell-like foil sections.

Here, the anode 1.2.1 is formed as a negative electrode and the cathode 1.2.3 is formed as a positive electrode. The anode 1.2.1 and the cathode 1.2.3 are referred to below as electrodes.

The electrodes of the single cell 1 are each formed from a substrate and are coated with an electrically conductive matrix 2, into which an active material 3 is integrated in a defined manner, as is shown in the following FIGS. 2A to 3B.

Figure 2A:
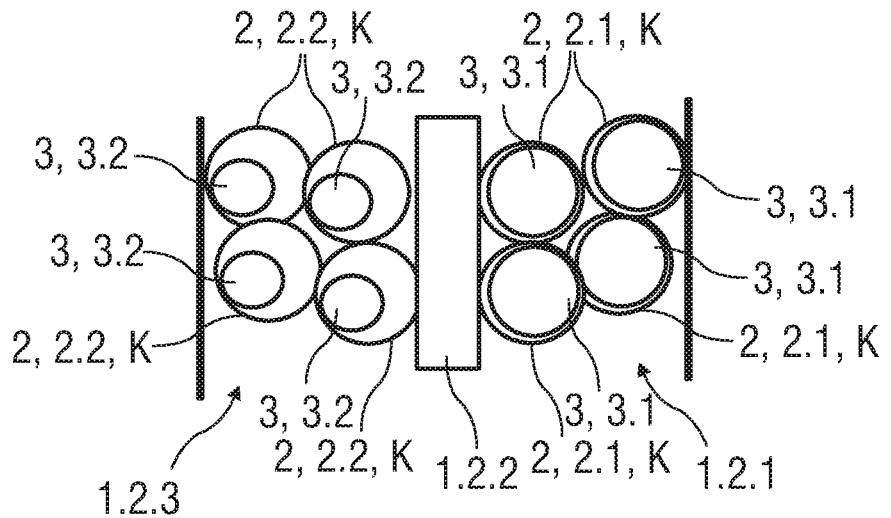
FIG. 2A is a schematic view of a sectional depiction of an electrode arrangement of a single cell according to the prior art in the charged state.
Figure 2B:
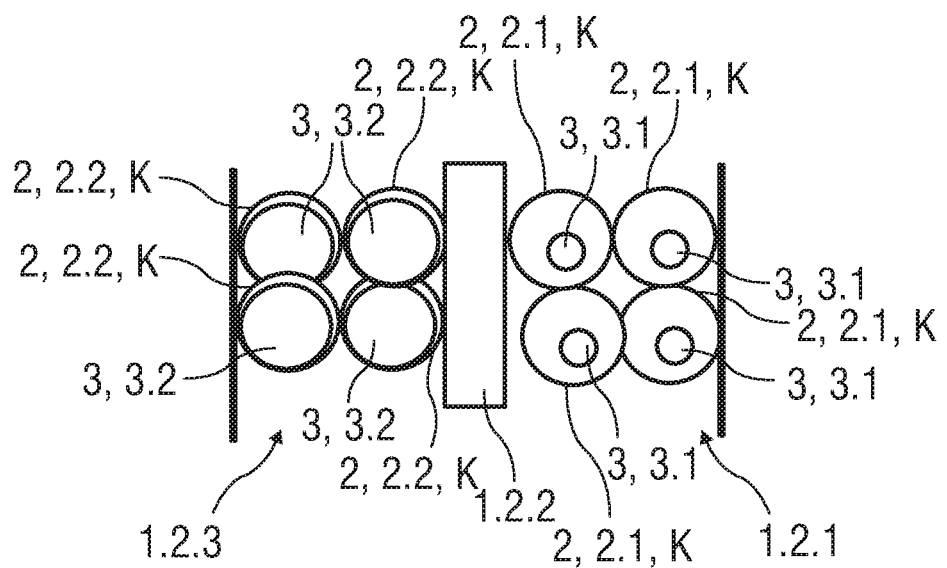
FIG. 2B is a schematic view of a sectional depiction of the electrode arrangement of the single cell according to the prior art in the discharged state.

FIGS. 2A and 2B each show a sectional depiction of a section from a single cell 1 having an anode 1.2.1, a cathode 1.2.3 and a separator 1.2.2 according to the prior art. Here, the single cell 1 in FIG. 2A is shown in a charged state and in FIG. 2B in a discharged state.

In the charged state, an anodic active material 3.1 is intercalated in an anodic, electrically conductive matrix 2.1. A cathodic active material 3.2 is embedded in a cathodic, electrically conductive matrix 2.2. If the battery is formed as a lithium-sulphur battery, the anodic active material 3.1 comprises lithium ions. If it is a sodium-sulphur battery, the anodic active material 3.1 comprises sodium ions. Here, the cathodic active material 3.2 is sulphur in each case. The cathodic, electrically conductive matrix 2.2 is formed from an electrically conductive carbon structure K such as, for example, graphite or carbon black. The anodic, electrically conductive matrix 2.1 is formed from an electrically conductive carbon structure K and a silicon structure S.

In the discharged state, the anodic active material 3.1 is bonded to the cathodic active material 3.2 and is intercalated together with this in the cathodic, electrically conductive matrix 2.2. In the discharged state, the cathodic active material 3.2 and the anodic active material 3.1 thus form an enlarged volume within the cathodic, electrically conductive matrix 2.2. The single cell 1 therefore has to have appropriate dimensions in order to compensate for the volumetric changes to the active materials 3.1, 3.2. To that end, the carbon structures K and the silicon structures S have appropriately large hollow spaces or pores into which the active materials 3.1, 3.2 are able to expand.

The electrochemical processes using a lithium-sulphur battery are set out in brief below:

During discharge of the battery, lithium is oxidized into lithium ions and electrons. The lithium ions travel through the separator 1.2.2 to the cathode 1.2.3, while at the same time the electrons are transferred via an outer circuit from the anode 1.2.1 to the cathode 1.2.3, wherein an energy consumer can be interconnected between the cathode 1.2.3 and the anode 1.2.1, the energy consumer being supplied with energy by the electron flow. At the cathode 1.2.3, the lithium ions are absorbed by a reduction reaction, wherein sulphur is reduced to lithium sulphide.

The electrochemical reaction when discharging a battery is generally known and can, with the example of the lithium-sulphur battery, be described as follows:

Anode 1.2.1: $Li \rightarrow Li^+ + e^-$;

Cathode 1.2.3: $S_8 + 2Li^+ + e^- \rightarrow Li_2S_8 \rightarrow Li_2S_6 \rightarrow Li_2S_4 \rightarrow Li_2S_2 \rightarrow Li_2S$ When charging the battery, an energy source is connected to the electrodes. The lithium is thus oxidized from lithium sulphide to lithium cations, wherein the lithium cations travel via the separator 1.2.2 and the electrons via the outer circuit back to the anode 1.2.1.

When discharging the battery, polysulphides may additionally arise which are potentially not completely converted into elemental sulphur during the charging process. Due to the fixed pore size, these polysulphides may travel out of the cathode 1.2.3 via the separator 1.2.2 to the anode 1.2.1 and form a lithium-sulphide layer there which considerably reduces a capacity and therefore a lifespan of the battery. In addition, the cathodic active material 3.2 is removed successively.

Furthermore, due to the fixed pore sizes of the electrically conductive matrices 2.1, 2.2, electrical contacting of the electrodes can weaken, such that the efficiency of the battery is reduced.

To solve the problem, the invention makes provision to form the separator 1.2.2 with mechanical flexibility. In addition, the carbon structure K and the silicon structure S are formed with mechanical flexibility, wherein, for this purpose, the silicon structure S comprises nanoscale, tubular structures made from silicon.

The embodiment according to the invention of the electrochemical energy storage system is described in greater detail in FIGS. 3A and 3B below.

Figure 3A:
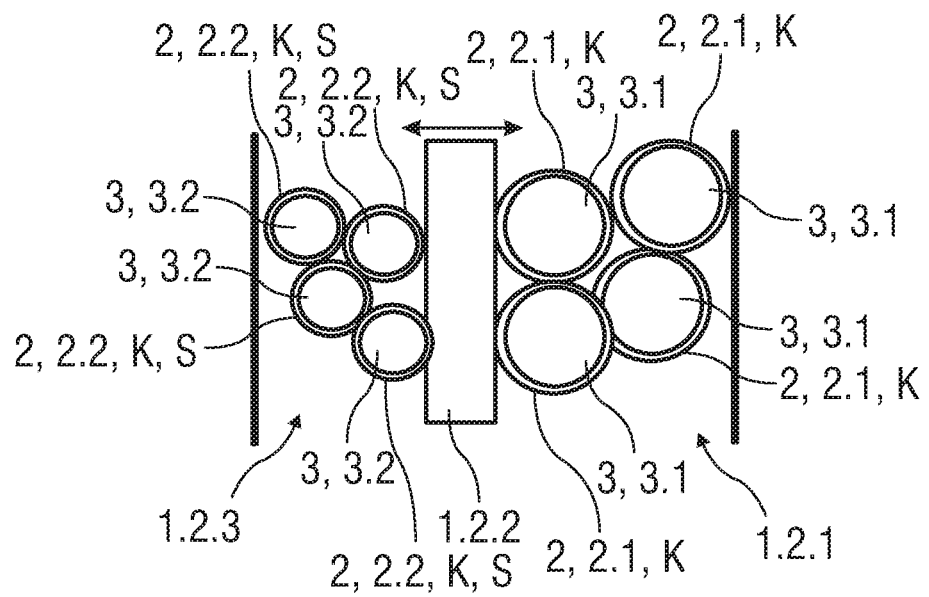
FIG. 3A is a schematic view of a sectional depiction of an electrode arrangement of a single cell in the charged state according to the invention.
Figure 3B:
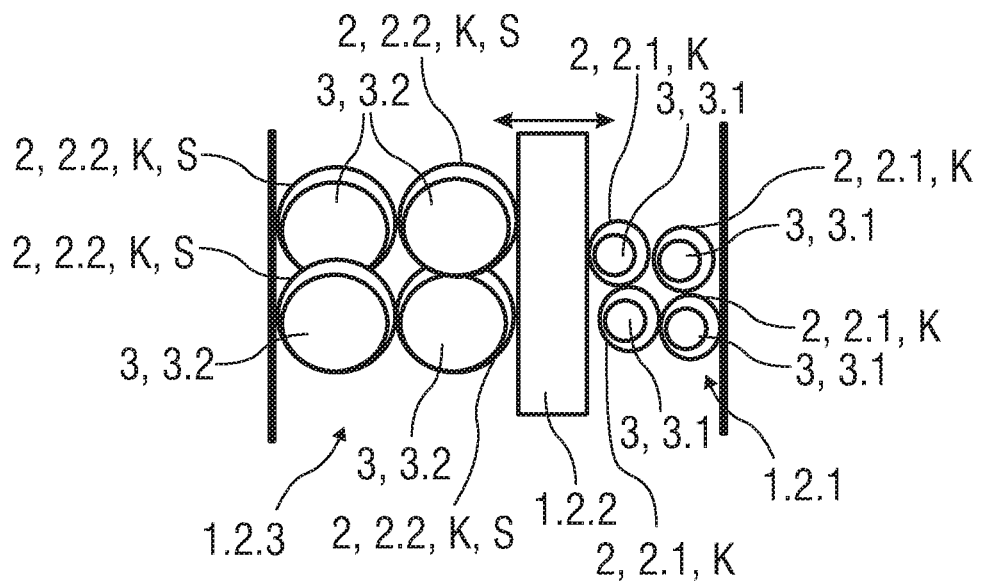
FIG. 3B is a schematic view of a sectional depiction of the electrode arrangement in the discharged state according to the invention.

To that end, FIGS. 3A and 3B each show a sectional depiction of a section from a single cell 1 having an anode 1.2.1, a cathode 1.2.3 and a separator 1.2.2 in the sense of the invention. Here, the single cell 1 in FIG. 3A is shown in a charged state and in FIG. 3B in a discharged state.

Here, in the charged state of the single cell 1, a volumetric expansion of the cathodic, electrically conductive matrix 2.2 is reduced compared to the exemplary embodiment shown in FIG. 2A. Due to the mechanically flexible design of the carbon structure K, this is adapted to the volume that is predetermined by the cathodic active material 3.2. The volumetric expansion of the anodic, electrically conductive matrix 2.1 corresponds here to the volumetric expansion of the anodic, electrically conductive matrix 2.1 according to the exemplary embodiment shown in FIG. 2A.

In the discharged state of the single cell 1, the cathodic active material 3.2 is, for example, reduced to lithium sulphide and thereby enlarges its volume in accordance with the exemplary embodiment shown in FIG. 3B. The volume of the cathodic, electrically conductive matrix 2.2 is enlarged here compared to the charged state of the single cell 1 shown in FIG. 3A, corresponding to the enlarged volume of the cathodic active material 3.2. Since there is less anodic active material 3.1, for example lithium ions, present in the anode 1.2.1 in the discharged state of the single cell 1, the anodic, electrically conductive matrix 2.1 is adapted in terms of its volume to the volume of the anodic active material 3.1. This means that the carbon structure K and the silicon structure S are able to adapt their volumes to the volume of the active material 3.1, 3.2 that is embedded in them. Here, a pore size of the carbon structure K can also be varied in such a way that the cathodic active material 3.2 is irreversibly adsorbed in the carbon structure K, such that a removal of the cathodic active material 3.2 can be prevented or at least reduced.

In the exemplary embodiment shown in FIG. 3A, i.e., in the charged state of the single cell 1, the separator 1.2.2 is shifted in the direction of the cathode 1.2.3 compared to the exemplary embodiment shown in FIG. 2A, such that a cathode space is reduced relative to an anode space. Since the volumetric expansion of the anodic active material 3.1 in the charged state is enlarged compared to the volumetric expansion of the cathodic active material 3.2, the separator 1.2.2 is, due to its mechanically flexible design, shifted passively in the direction of the cathode 1.2.3.

In the exemplary embodiment shown in FIG. 3B, i.e., in the discharged state of the single cell 1, the separator 1.2.2 is shifted in the direction of the anode 1.2.1 compared to the charged state, such that the anode space is reduced relative to the cathode space.

In addition, it is also possible to compress a volume of the separator 1.2.2 if the active materials 3.1, 3.2 of the electrodes expand. Here, however, care must be taken to ensure that the volume of the separator 1.2.2 can only be compressed to such an extent that an ion exchange between the electrodes is still possible.

The separator 1.2.2 can, to that end, be formed from a porous glass fiber membrane, a porous ceramic film or a porous polymer membrane.

Due to the passive positional change to the separator 1.2.2, the volumetric changes to the active materials 3.1, 3.2 can be compensated for, such that the dimensions of the single cell 1 are able to be reduced compared to the prior art, whereby less construction space is required. The additional mechanical flexibility of the electrically conductive matrices 2.1, 2.2 also enables a further compensation for the volumetric changes to the active materials 3.1, 3.2, such that a mechanical strain of the electrodes is kept as low as possible. The electrochemical energy storage system presented here is therefore also distinguished by a high level of performance with a long lifespan.

The invention claimed is:

1. An electrochemical energy storage system, comprising:
   two electrodes; and
   a separator disposed between the two electrodes, wherein the separator is mechanically flexible such that a position of the separator between the two electrodes is alternatively shiftable in respective directions towards the two electrodes depending on an electrochemical process taking place between the two electrodes such that a size of a cathode space is different from a size of an anode space as a result of alternatively shifting the position of the separator and wherein the separator has elasticity such that a volume of the separator is compressed as a result of an expansion of respective active materials of the two electrodes.

2. The electrochemical energy storage system according to claim 1, wherein the separator is formed from a glass fiber membrane.

3. The electrochemical energy storage system according to claim 1, wherein an electrolyte is disposed in the separator.

4. The electrochemical energy storage system according to claim 1, wherein the two electrodes each include a coating made from a composite material, wherein the composite material comprises an electrically conductive matrix and an active material.

5. The electrochemical energy storage system according to claim 4, wherein the electrically conductive matrix comprises a porous and mechanically flexible carbon structure.

6. The electrochemical energy storage system according to claim 4, wherein the electrically conductive matrix of at least one of the two electrodes comprises a silicon structure.

7. The electrochemical energy storage system according to claim 6, wherein the silicon structure comprises nanoscale, tubular structures made from silicon.

8. A battery, comprising:
   at least one electrochemical energy storage system according to claim 1.

* * * * *